Patented May 18, 1943

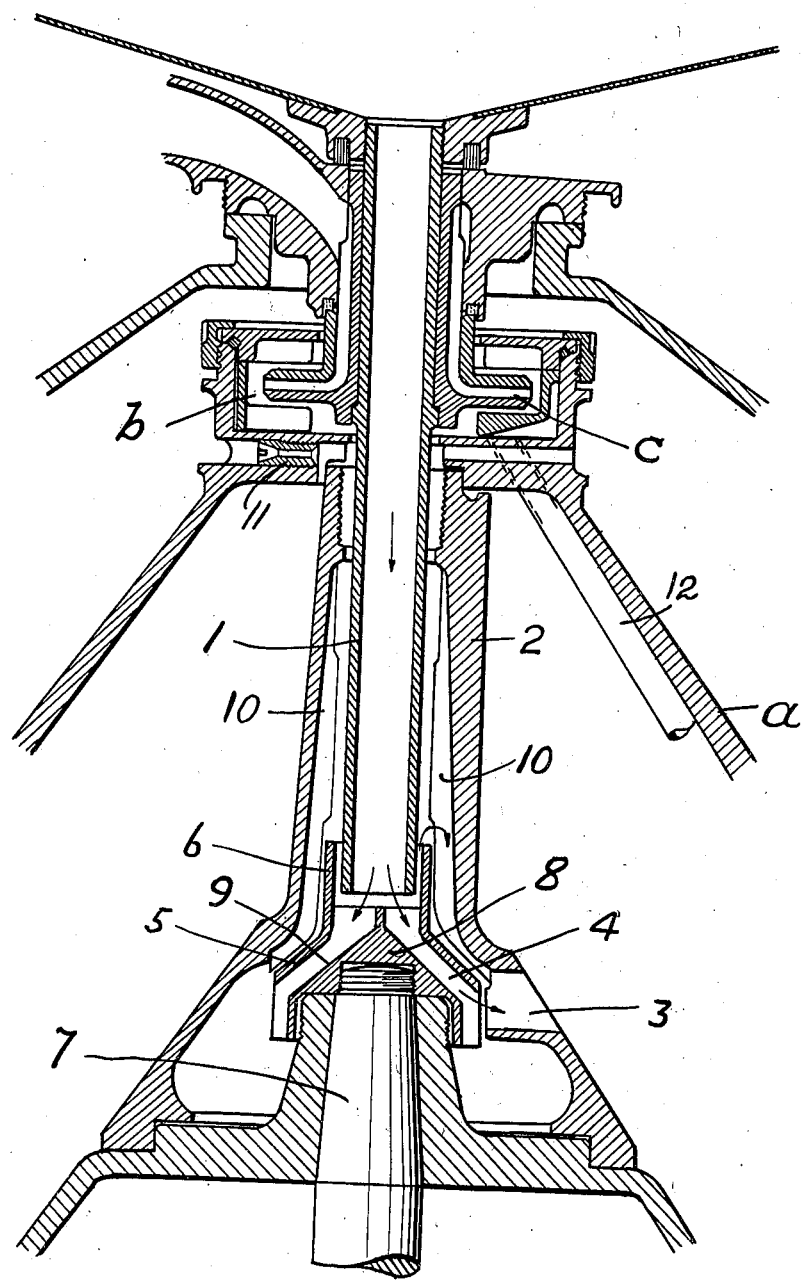

2,319,653

UNITED STATES PATENT OFFICE 2,319,653

CENTRIFUGAL SEPARATOR

Stig Holger Bjarne Zachariassen, Stockholm, Sweden, assignor to The De Laval Separator Company, New York, N. Y., a corporation of New Jersey Application March 28, 1940, Serial No. 326,320
In Sweden April 3, 1939

12 Claims. (Cl. 233—40)

In centrifugal separators for separating whole milk into cream and skim milk in which the whole milk is fed into the separator bowl in a free jet, the fat globules may be so split up as to substantially increase the fat content of the skim milk. It is known, also, to feed whole milk into the separator bowl under pressure through a pipe communicating with the bowl by a packing device. In the latter arrangement the bowl is kept wholly filled with liquid so that the loss due to impact is reduced, thereby reducing the atomization of the fat globules, which results in an improved skimming effect; but the provision of a satisfactory tightening or sealing device between the bowl and the spindle involves an undesirable application.

The object of my invention is to provide a centrifugal separator which does not necessitate feeding the supply liquid to the bowl under pressure, but which greatly reduces impact and resultant splitting up of fat globules and froth formation.

A preferred embodiment of the invention is shown in the accompanying drawing, which is a vertical sectional view of a centrifugal separator embodying my invention.

The whole milk to be separated is fed through a central stationary feed tube 1 into a distributor 2 that communicates, through holes 3, with the separating chamber $a$ of the bowl and the discs (not shown) contained therein. The distribtuor 2 is open at the top and may communicate with the atmosphere through openings in the bowl wall in order to ensure constant pressure in the interior of the bowl.

Inside the distributor 2 are conveyor wings 4 extending below the lower discharge end of the feed tube and on which rests a disc or cover 5 having a neck 6 surrounding the feed tube and extending above and surrounding the lower end of the feed tube, the annular space between them being preferably no wider than is necessary to prevent contact between the neck and feed tube during rotation of the bowl.

The wing system 4 overlies a nut 8 fixed to the bowl spindle 7. The nut has, preferably, a conical upper surface 9 having a central apex located along the axis of centrifuge, thereby being adapted smoothly to deflect the liquid jets discharging from the lower end of the feed tube 1.

The wing cover 5 should extend further from the center than the inner level of the liquid in the distributor 2, which level is the inner edge of the wall just below the cream screw 11 at the left of the upper end of distributor 2.

The distributor 2 should be provided with additional conveyor wings 10 between the distributor wall and the cover 5 and neck 6 and extending (preferably) up to the upper end of the distributor. Between the distributor wall and the disc 5 and neck 6 are thus provided channels which permit any liquid leaking or splashing upward through the annular space between the feed tube and the neck 6 to enter the separating chamber of the bowl.

In operation the whole milk discharged from the lower end of the stationary feed tube 1 flows directly into the downwardly and outwardly radiating channels formed by the conical surface of nut 8, the cover 5 and the wings 4 confined between the nut and cover. In its flow through these channels the rotational speed of the milk gradually increases from substantially zero to a velocity corresponding substantially to that of the inner wall of milk inside the distributor 2, thereby entering that wall of milk without shock. The outer marginal portions of this conical surface and cover terminate adjacent the hole or holes 3 connecting the distributor chamber with the separating space between the outer wall of the distributor chamber and the bowl wall. The described course of flow of the whole milk is indicated by arrows. Any liquid splashing upward from the bottom of feed pipe 1 will flow through the narrow annular space between the lower end of the feed tube and the neck 6 and thence down through the channels formed between the wings 10 to the hole or holes 3.

By the described construction a more nearly impactless supply of liquid is obtained than if the liquid were fed into the distributor in ways customary in non-closed bowls. Much less froth is mixed with the milk at the inlet, which is an important advantage, since milk which becomes mixed with froth is more difficult to separate than milk not so mixed.

The wing system 4 may be secured either to the nut 8 or to the cover 5, the drawing being consistent with either construction. The invention is not limited to the location of the inlet chamber of the distributor at any particular height with respect to the bowl and spindle, nor to any details of construction, location and arrangement not specified in the appended claims.

The invention is particularly adapted, although not necessarily limited, to be applied to that type of separator provided with a parer chamber rotating with the bowl and into which one of the liquids separated in the bowl flows and from which such liquid is withdrawn by means of a stationary parer. Such a parer chamber $b$ and parer $c$ are shown in the drawing. The separated skim milk is discharged from the peripheral zone of the separator through the tube 12 communicating with the parer chamber $b$. The separated cream is discharged from the central or inner zone of the separator through the cream screw 11. The structural details of the machine, aside from the means for feeding the whole milk to the separating chamber, are not further described, since they form no part of the invention.

What I claim and desire to protect by Letters Patent is:

1. A centrifugal separator in accordance with claim 8 comprising also a neck integral with and extending above the cover and forming a tubular member surrounding the lower end of the feed tube and spaced therefrom only sufficiently to safely prevent contact therewith during the rotation of the bowl.

2. A centrifugal separator in accordance with claim 8 comprising also other conveyor wings in the space between the feed tube and the distributor wall.

3. A centrifugal separator in accordance with claim 8 comprising also a neck integral with and extending above the cover and forming a tubular member surrounding and spaced from the lower end of the feed tube and other conveyor wings extending above said cover and between the distributor wall and said neck and feed tube and forming channels through which any feed liquid flowing upward between the feed tube and the tubular member will be conveyed downward toward the outlet from the distributing chamber to the separating chamber.

4. A centrifugal separator in accordance with claim 8 comprising also a conical member below said wings and rotating with the distributor chamber and the apex of which is located along the axis of the separator and the downwardly sloping upper face of which forms the bottoms of said flow channels and terminates at substantially the level of the outlet from the distributing chamber to the separating chamber.

5. A centrifugal separator in accordance with claim 9 comprising also a neck integral with and extending above the cover and forming a tubular member surrounding the lower end of the feed tube and spaced therefrom only sufficiently to prevent contact therewith during the rotation of the bowl.

6. A centrifugal separator in accordance with claim 9 comprising also a neck integral with and extending above the cover and forming a tubular member surrounding the lower end of the feed tube and other conveyor wings extending above said cover and between the distributor wall and said neck and feed tube and forming channels through which any liquid flowing upward between the feed tube and said neck will be conveyed downward through the space between the distributor wall and neck toward the outlet from the distributing chamber to the separating chamber.

7. In a centrifugal separator, the combination, with a stationary central feed tube and a rotary bowl provided with a separating chamber, an outlet for the lighter separated constituent, and a central distributing chamber communicating with the separating chamber and through which the liquid to be separated is fed from the feed tube to the separating chamber, of a shockless accelerator for the liquid rotating with the bowl and comprising spaced apart conical members, one above the other, whose axes coincide with the axis of the bowl, affording a passage between them for the flow of feed liquid from the central feed tube toward the separating chamber, the outer edges of said conical members being further from the center of the bowl than said outlet for the lighter separated constituent, a tubular upward extension from the inner edge of the upper conical member, said tubular extension surrounding the lower end of the feed tube with substantially a minimum non-contacting running clearance, and a plurality of wings extending from the center of the bowl outward through said passage between and closely adjacent to said cones to about their peripheries.

8. A centrifugal separator comprising a stationary central feed tube, a rotary bowl provided with a separating chamber and a central distributing chamber surrounded by and having an outlet communicating with the separating chamber and into which the feed tube extends and through which the liquid to be separated is fed from the feed tube to the separating chamber, conveyor wings in and rotatable with the distributing chamber and located below the lower outlet end of the feed tube, said wings forming between them flow channels, and within the distributing chamber an annular cover for the wings closely adjacent thereto and rotating therewith and spaced from the outer wall of the distributor chamber, said wings extending from the center of rotation outward beyond the inner face of the liquid rotating in the distributing chamber and terminating substantially at the level of the outlet from the distributing chamber to the separating chamber.

9. A centrifugal separator comprising a stationary central feed tube, a rotary bowl provided with a separating chamber and a central distributing chamber surrounded by and having an outlet communicating with the separating chamber and into which the feed tube extends and through which the liquid to be separated is fed from the feed tube to the separating chamber, a conical member rotating with the bowl and distributor the apex of which is located along the axis of the separator and along and above the downwardly sloping face of which liquid from the feed tube flows toward the outlet from the distributing chamber to the separating chamber, conveyor wings above and closely adjacent to and rotatable with the conical member and extending from the center outward further from the center of rotation than the inner face of the liquid rotating in the distributing chamber, and in the distributor chamber an annular cover for the conveyor wings closely adjacent thereto and rotating therewith and spaced from the outer wall of the distributor chamber and extending further from the center of rotation than the inner face of the liquid rotating in the distributing chamber and terminating adjacent the outlet from the distributing chamber to the separating chamber.

10. A centrifugal separator comprising a stationary central feed tube, a rotating bowl provided with a separating chamber and with a central distributing chamber communicating with the separating chamber and through which the liquid to be separated is fed from the feed tube to the separating chamber, wings in and extending from the center of rotation of and rotating with the distributing chamber and forming between them flow channels, a tubular member in and rotating with the distributing chamber and extending above said wings and into which the lower end of the feed tube extends, there being substantially only sufficient clearance between the tubular member and feed tube to prevent contact during rotation of the bowl, and wings secured to the distributor wall above the first named wings and extending vertically within the annular space between the distributor wall and said feed tube and tubular member and forming channels through which any feed liquid flowing upward between the feed tube and the tubular member will be conveyed downward toward the outlet from the distributing chamber to the separating chamber.

11. A centrifugal separator comprising a stationary central feed tube having a bottom outlet for the material to be separated, a central distributing chamber surrounding the lower part of the feed tube, the lower part of the distributing chamber being enlarged in diameter and extending below the feed tube, a separating chamber surrounding the distributing chamber and having an opening communicating with the enlarged lower end of the distributing chamber below the outlet end of the feed tube, wings in the distributing chamber below the outlet end of the feed tube, said wings extending from the center of rotation and forming between them flow channels extending from below the outlet of the feed tube to about the opening between the distributing chamber and the separating chamber, and a tubular member of circular contour in cross-section in, and spaced from the wall of and rotating with, the distributing chamber and extending above said wings and into which the lower end of said feed tube extends, there being substantially no greater clearance between the tubular member and the feed tube than necessary to prevent contact between them during rotation of the bowl.

12. A centrifugal separator in accordance with claim 11 comprising also a conical member below said wings and rotating with the distributor chamber and the apex of which is located along the axis of the separator and the downwardly sloping upper face of which forms the bottoms of said flow channels and terminates at substantially the level of the outlet from the distributing chamber to the separating chamber.

STIG HOLGER BJARNE ZACHARIASSEN.